(12) United States Patent
Jansen

(10) Patent No.: US 9,105,193 B2
(45) Date of Patent: Aug. 11, 2015

(54) MOTION PLATFORM AND AIRCRAFT SIMULATOR COMPRISING THE SAME

(75) Inventor: Cornelis Maria Jansen, Nijmegen (NL)

(73) Assignee: Melomania B.V., Nijmegen (NL)

( * ) Notice: Subject to any disclaimer, the term of this patent is extended or adjusted under 35 U.S.C. 154(b) by 136 days.

(21) Appl. No.: 13/819,831

(22) PCT Filed: Aug. 24, 2011

(86) PCT No.: PCT/NL2011/050575
§ 371 (c)(1),
(2), (4) Date: Feb. 28, 2013

(87) PCT Pub. No.: WO2012/030211
PCT Pub. Date: Mar. 8, 2012

(65) Prior Publication Data
US 2013/0157227 A1      Jun. 20, 2013

(30) Foreign Application Priority Data

Aug. 30, 2010    (NL) ...................................... 2005293

(51) Int. Cl.
| | | |
|---|---|---|
| *G09B 19/00* | (2006.01) | |
| *G09B 9/00* | (2006.01) | |
| *G09B 9/14* | (2006.01) | |
| *G09B 9/08* | (2006.01) | |

(52) U.S. Cl.
CPC .. *G09B 9/00* (2013.01); *G09B 9/08* (2013.01); *G09B 9/14* (2013.01)

(58) Field of Classification Search
CPC .............. G09B 9/00; G09B 9/08; G09B 9/12; A63G 31/02
USPC ....................................................... 434/11–72
See application file for complete search history.

(56) References Cited

U.S. PATENT DOCUMENTS

| | | |
|---|---|---|
| 3,645,011 A | 2/1972 | Callanen |
| 5,490,784 A | 2/1996 | Carmein |
| 2002/0068640 A1 | 6/2002 | Uemura |
| 2003/0125119 A1 | 7/2003 | Jones |

FOREIGN PATENT DOCUMENTS

| | | |
|---|---|---|
| FR | 2257967 | 8/1975 |
| GB | 1232586 | 5/1971 |

*Primary Examiner* — Timothy A Musselman
(74) *Attorney, Agent, or Firm* — Marcus C. Dawes; Daniel L. Dawes

(57) ABSTRACT

The present invention is related to a motion platform and aircraft simulator comprising the same. According to the invention, a motion platform is provided using at least three uprights and a sub-frame connected to the uprights by connecting members. A cabin in which a person can be accommodated is connected to the sub-frame. By restricting the way the various components are capable of moving relative to each other a motion platform is obtained which is able to offer the desired simulation of motion such as translational movement, pitch, roll, and yaw of the cabin.

20 Claims, 12 Drawing Sheets

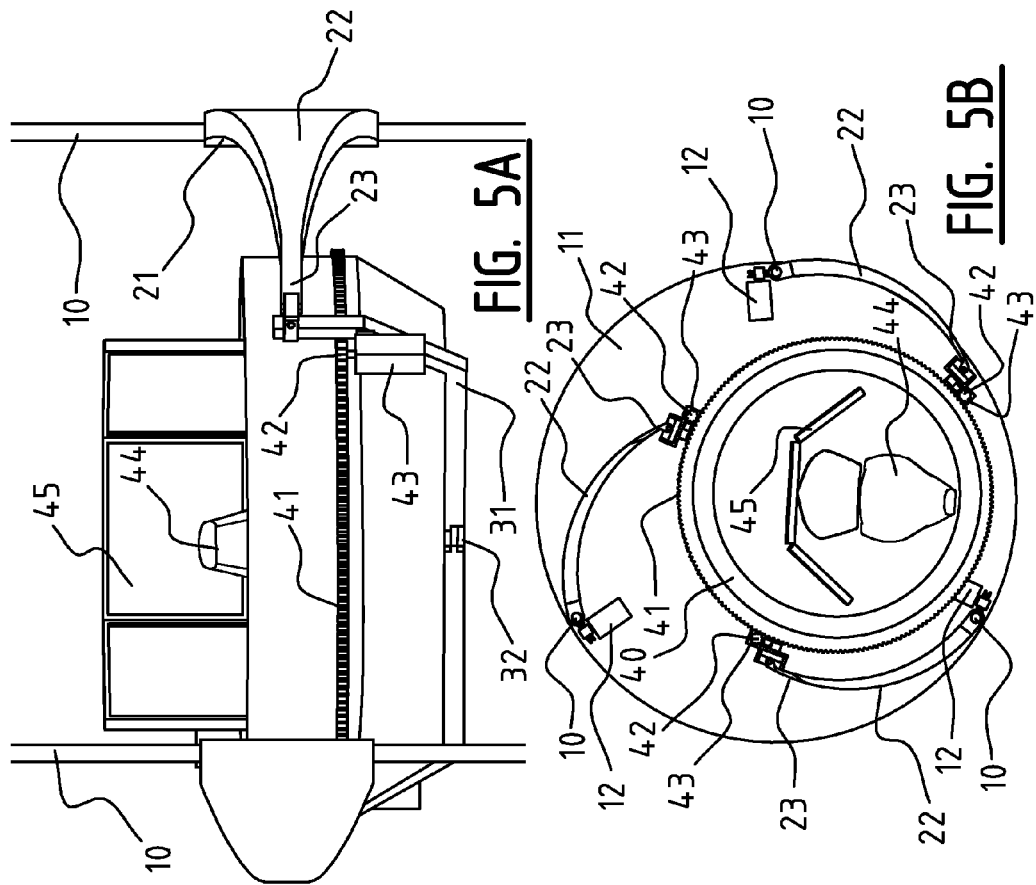
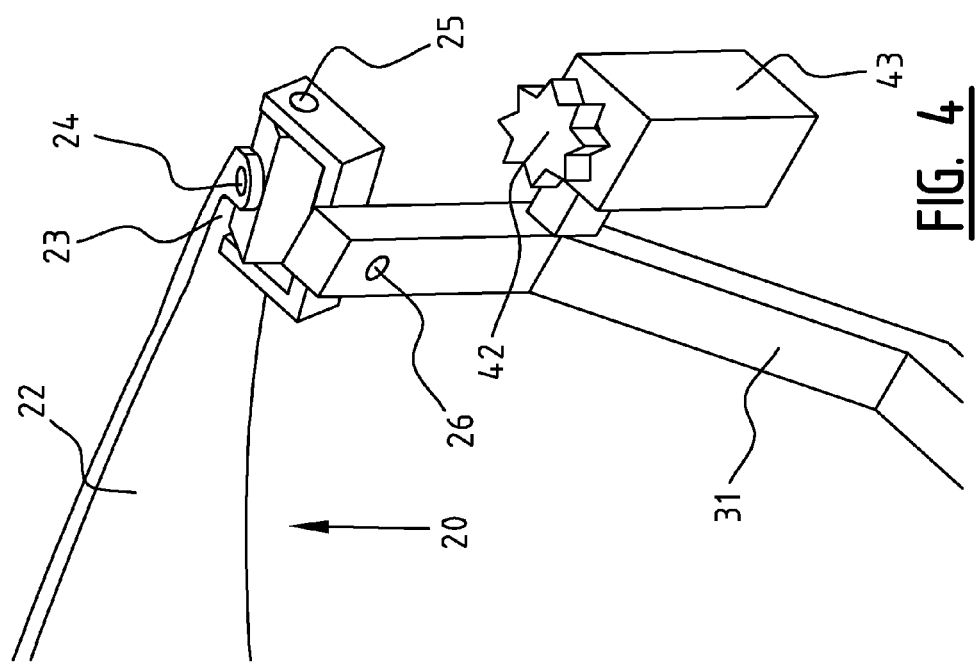

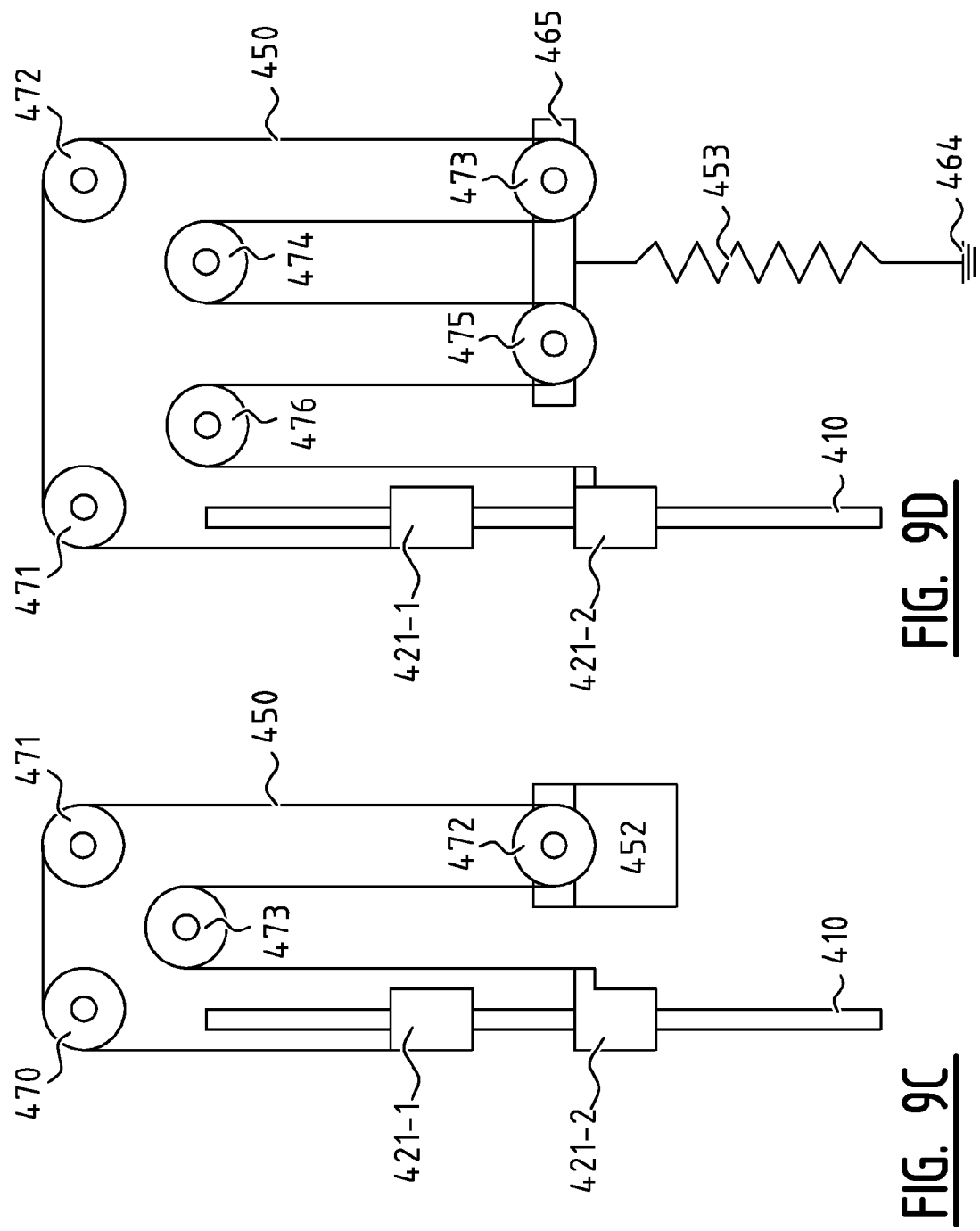

MOTION PLATFORM AND AIRCRAFT SIMULATOR COMPRISING THE SAME

The present invention is related to a motion platform and aircraft simulator comprising the same.

Aircraft simulators are known in the art. Such simulators comprise a mechanical motion platform accommodating a cabin in which a person can be seated. The motion platform itself is able to simulate the movement of an aircraft. Such movement includes yaw, pitch, roll and translational movement. Yaw corresponds to the rotation of the aircraft about a vertical axis during normal flight, pitch to a rotation about an axis parallel to the wings, and roll to a rotation about the longitudinal axis of the plane.

Typically, the motion platform is provided with a display system and manually operable control element such as a joystick. By using the joystick, the simulator controls the mechanical position of the motion platform and the content of what is displayed on the display system to give the user the impression that he or she is actually flying an aircraft. To that end, the simulator comprises a controller that is configured to control the positioning of the motion platform in dependence of an operation of the joystick. More in particular, the controller is able to control the various actuators that are disposed in the motion platform to enable the aforementioned motion.

Most simulators are based on hexapod type motion platforms. In these motion platforms, a number of hydraulic cylinders are connected on one end to a stationary frame and on the other end to the cabin. Other configurations employ electric actuators to provide the required actuation.

A drawback of using a hexapod type motion platform is that this mechanical concept is space consuming and requires expensive components. This limits the availability of aircraft simulators based on the hexapod principle to the public at large. Another disadvantage is the limited range of movement for one or more of the six possible movements. In particular, if a high range of movement in the vertical direction is required, the arms of the hexapod need to be long and disposed far apart.

It is therefore an object of the present invention to provide an alternative to the known simulators, wherein preferably some of the above mentioned drawbacks do not occur, or at least in a lesser degree.

This object is achieved using the motion platform according to the present invention. The motion platform of the invention is preferably suitable for simulating motion of an aircraft.

The motion platform of the invention comprises a stationary frame with at least three uprights and a sub-frame disposed substantially within the stationary frame. An upright is generally an elongated structure extending in vertical direction with respect to a supporting surface, such as the ground.

The motion platform further comprises at least three connecting members for connecting each upright with the sub-frame at a respective connection point. Normally, a single connecting member is arranged for each upright. The point where the connecting member connects to the sub-frame is referred to as connection point. The connection point may correspond to a material point of the sub-frame. However, it may also refer to a mathematical object, for instance in the case where the connection point lies within a cavity.

Generally, each connecting member is connected to the sub-frame at a different connection point. Hence, in a typical configuration, the motion platform comprises as much connecting members as there are uprights. The same applies to the number of different connection points.

The motion platform further comprises a cabin that is connected to the sub-frame and that is suitable for accommodating a person. The cabin need not be a closed structure. The purpose of the cabin is to accommodate a person, and if applicable, a display system and manually operable control element such as a joystick.

A plurality of actuators are arranged to change the configuration of the motion platform. That is, the sub-frame, the connecting members, and the cabin form a jointed structure. By engaging or actuating the jointed structure, the actuators may cause a translational motion and/or at least one of the group consisting of a pitch, a yaw, and a roll of the cabin with respect to the stationary frame, or a combination thereof. These motions or movements need not occur simultaneously.

The sub-frame and connecting members are preferably configured such that, during use, each of the connection points is at a substantially fixed distance with respect to a common central point of the sub-frame. The common central point of the sub-frame need not correspond to a material point of the sub-frame. Also here, it may refer to a mathematical object, such as a point in a cavity within the sub-frame.

In addition, it is noted that the common central point is with reference to the sub-frame. It is in general not an absolute position in space, for instance referring to the stationary frame. On the contrary, because the sub-frame is moving, so will the common central point. The same applies to the connection points which may move along with the connecting members and the sub-frame.

As the sub-frame is disposed substantially within the stationary frame, the same applies for the cabin. In an embodiment of the motion platform, the uprights are arranged in a triangular configuration. In this case, the cabin and sub-frame are substantially confined within a hypothetical cylinder of which the outer edge coincides with the uprights.

Furthermore, it is normally preferred to arrange the connection points in a spaced apart manner. More in particular, the connection points are preferably arranged near the outer edge of the cabin. Mostly, the distance between each connection point and the common central point is in the order of the height, width, or length of the cabin, or another typical parameter representative for the size of the cabin in one or more directions. If the cabin is configured as a spherical shape, the distance between each connection point and the common central point is in the order of half the outer diameter of the cabin. Other geometries of the cabin are expressly not excluded from the present invention. When the connection points all lie within a plane, it is preferred if the connection points are near or beyond the outer edge of the cabin when the cabin is projected onto the plane in a direction perpendicular to the plane. For instance, if the cabin is a box, the projection will result in a square. In such a case, the connection points preferably are close to or extend beyond the outer edge of the square. If the cabin is a sphere, the projection will result in a circle. In that case, the connection points preferably lie outside or near the circle.

If the connection points are placed too close together, it becomes very difficult to realize the various desired motions. A small change in the positioning of the connecting members may result in a large change in positioning of the cabin. Consequently, the forces required to bring about this positional change could be considerable. A further disadvantage is that the cabin might quickly come into contact with the connecting member. By placing the connection points further apart, this problem can be obviated.

The connecting members are configured such that the desired motion, such as pitch and/or translation, can be realized. In other words, the motion platform should have enough degrees of freedom offered by various joints or couplings in the system. Given the jointed structure of the motion platform, one must try to obtain a stable system by imposing sufficient boundary conditions in the form of actuators. The actuators, when actuated, prescribe a specific mutual positioning between various components in the system. To reduce costs and complexity, it is normally desired to use the minimum amount of actuators required to achieve the desired functionality. In case the jointed structure has many joints, more actuators will be needed to make the structure stable. The motion platform of the present invention has the advantage that a limited amount of actuators, e.g. six, are normally needed to enable the platform to move using six degrees of freedom.

Within the context of the present invention, the distance between each connection point and the common central point of the sub-frame is substantially fixed. This requirement puts a mechanical restriction on the realization of the motion platform. It should be noted that this requirement only specifies the distance between the common central point and the connection point(s). It does not define the absolute position of the connection point(s) or the common central point. Moreover, each connection point may be at a different, though fixed, distance with respect to the common central point.

In an embodiment of the motion platform, the connection points are, during use of the motion platform, movable with respect to the common central point while keeping the distance between the common central point and each of the connection points substantially fixed. Because the connection points are movable with respect to the common central point, the sub-frame becomes more flexible than the case in which the connection points are fixed in position with respect to the common central point. Consequently, to maintain a stable system, degrees of freedom must be reduced for other components in the system.

In an embodiment, each of the connection points lies on the same circle having the common central point as the centre point of the circle. Here, the distances between the connection points and the common central point are identical allowing for a symmetric structure that is easier to fabricate and construct.

As stated before, the motion platform should be able to simulate translational movement, i.e. movement in the x, y, and/or z direction, and at least one of the group consisting of a pitch, a yaw, and a roll of said cabin with respect to the stationary frame. Preferably, the motion platform is configured to enable all of these motions, i.e. a translational motion, a pitch, a yaw, and a roll of said cabin with respect to the stationary frame, and/or combinations thereof. These motions or movements need not, but may, occur simultaneously.

In an embodiment, each connecting member comprises an arm, a first coupling, and a second coupling, wherein the first coupling couples a first end of the arm to an upright of the stationary frame, and wherein the second coupling couples a second end of the arm to the sub-frame at said connection point.

In an embodiment, the first coupling of at least one of the connecting members is movably mounted to the relevant upright to allow vertical displacement of the first coupling relative to the upright. If all first couplings are arranged in this manner, translational movement in the vertical direction can be achieved. This allows advantages over known systems in that it is straightforward to enable a larger dynamic range in the vertical direction. Increasing this range does not or hardly impose requirements on the remaining components, such the actuators in particular. Moreover, counterweights or another weight compensation system can be used to obtain a more balanced system. Examples of such a system will be discussed later. Actuators arranged for moving the connecting members up and down can become smaller due to the use of these counterweights. Counterweights cannot be used in known hexapod solutions.

If the vertical motion is not required, a single first coupling may enable a pitch or roll motion.

In an embodiment, the first coupling is slidably mounted to the upright. For instance, a pulley system can be arranged using a loop cable that extends along side the upright. This cable is at some point connected to the first coupling. By driving the cable, the first coupling can be moved vertically with respect to the upright. The aforementioned counterweight could be connected to the cable. The cable could also be in the form of a notched or toothed belt that is connected to the first coupling.

In another embodiment, the upright is provided along its longitudinal direction with a toothed structure. A drivable gear is arranged on the connecting member to engage the toothed structure. Driving the gear will allow the first coupling to move up and down the upright.

In an embodiment, the first coupling of at least one of the connecting members is configured to allow the arm of said at least one of the connecting members to pivot with respect to the upright. For instance, the first coupling could comprise a first part connected to the upright to allow the vertical displacement, and a second part, connected to the first part, the second part being hingedly connected to the corresponding arm. The first coupling could also comprise a ring like structure through which the upright extends. This allows the first coupling to rotate about the upright.

To cause the above mentioned pivoting, an individually controllable actuator can be arranged on the connecting member or the relevant upright. Driving this actuator could be used to specify the pivot angle of the arm with respect to the upright.

It should be noted that an arm of a connecting member can pivot with respect to the upright in different ways. Firstly, the arm may pivot about an axis that runs parallel to the upright. Secondly, the arm may pivot about an axis that is perpendicular to the upright. Each of these pivoting actions may be driven by an actuator arranged on the upright or connecting member.

In an embodiment, the cabin is pivotally mounted to the sub-frame to allow the cabin to rotate about a rotation axis. Hence, in this embodiment, the sub-frame is able to move with respect to the stationary frame, and the cabin is in turn able to move with respect to the sub-frame.

In an embodiment, the rotation axis intersects the common central point. This allows for a balanced construction as the common central point normally corresponds to the central part of the sub-frame.

Within the context of the present invention, a rotation axis corresponds to a mathematical object defining a direction about which an object can rotate. It need not, but may well, relate to a material structure, such as an axle or shaft. For instance, the cabin can be rotationally mounted to the cabin at positions away from the rotation axis. Bearings may be provided on the sub-frame supporting the cabin. In another or further embodiment, the cabin is rotationally mounted to the sub-frame at the common central point.

To obtain a symmetric and balanced motion platform, the motion platform may be configured such that the connection points lie substantially in a plane that extends perpendicularly to the rotation axis. It should be noted that, due to the movement of the sub-frame and connecting members, the plane in question is not fixed in space. Neither is the rotation axis. Again, a plane may refer to a mathematical object. The plane need not, but may well, correspond to some sort of planar construction extending through the connection points.

In case the cabin is rotationally mounted to the sub-frame, an actuator may be provided on the sub-frame or the cabin for rotating the cabin with respect to the sub-frame. Hence, the cabin may rotate with respect to the stationary frame, or the sub-frame may rotate with respect to the stationary frame, or both.

In an embodiment of the motion platform, the sub-frame comprises a plurality of first further arms, each of said plurality of first further arms extending from the common central point towards a connection point. In general, the number of first further arms will correspond with the number of connection points, which in turn will correspond with the number of uprights.

The first further arms may be hingedly connected to each other at the common central point. However, this need not be the case. Again, it is matter of distributing the required degrees of freedom over the various components in the motion platform to obtain the desired types of motion. It should be further noted that it usually suffices to have the hinged connection configured such that the first further arms can pivot with respect to each other about one rotation axis only. Increasing the number of rotation axes, will normally require the number of actuators to increase to obtain a stable motion platform.

In a further embodiment, the sub-frame may comprise a further common central point spaced apart from the common central point, from which further common central point a plurality of second further arms extend to the connection points, wherein the first further arms and the second further arms form ribs that extend between the common central point and the further common central point, together defining a cavity in which the cabin is accommodated. In general, the number of second further arms corresponds to the number of first further arms. In addition, the first and second further arms need not be connected directly to each other at the connection points. An intermediary component can be provided. Such component may even be a second coupling relevant to the connection point in question.

Also the further common central point does in general not refer to an absolute position in space. Instead, the position is relative to the sub-frame.

In an embodiment, the first further arms correspond to arms that pass partially underneath the cabin, and the second further arms correspond to arms that pass partially above the cabin, or vice versa.

Similar to the first further arms, the second further arms may be hingedly connected to each other at the further common central point.

In an embodiment, the further common central point lies on the rotation axis. The cabin may be rotationally mounted to the sub-frame at the common central point and at the further common central point.

In an embodiment, the motion platform comprises an individually controllable actuator that is either configured to provide an engagement between a connecting member and the cabin to change the relative positioning between said connecting member and said cabin, or to provide an engagement between a connecting member and the sub-frame to change the relative positioning between said connecting member and said sub-frame, or to provide an engagement between the sub-frame and the cabin to change the relative positioning between said sub-frame and said cabin, or to provide an engagement between a connecting member and a first further arm connected thereto to change the relative positioning between said connecting member and said first further arm, or to provide an engagement between a first further arm and the cabin to change the relative positioning between said first further arm and the cabin.

Each of the aforementioned configurations of the individually controllable actuator may provide a driving force for the relevant connection point to move with respect to the common central point, although with a fixed distance. Such motion normally follows a circular path with respect to the common central point. However, as will be discussed next, actuating the actuator does not necessarily move the connection point with respect to the common central point.

In a further embodiment, the aforementioned individually controllable actuator is preferably disposed on each first further arm or rib if the sub-frame is involved in the motion or movement. These actuators are furthermore configured for engaging the cabin in the rotational direction of the cabin. If every actuator engages the cabin in a similar manner, possibly even corrected for differences in distance between a connection point and the common central point, the cabin may rotate with respect to the sub-frame and the connection points will not move. However, if the actuators engage the cabin differently, the connection points may move with respect to the common central point. It is noted that in some embodiments it may be possible to cause a horizontal movement of the cabin by moving the connection points individually around the common central point. Using the actuators disposed on the first further arms or ribs therefore provides an advantage over actuators providing engagement between the sub-frame and connecting members only, in the sense that a separate actuator for rotating the cabin can be omitted.

In a further embodiment, the cabin is provided with a curved toothed bar disposed around its outer circumference, and the individually controllable actuators are each configured to drive a separate gear. Engagement between the toothed bar and the gears can be directly or the motion platform could comprise a notched belt or toothed belt to provide transmission between each of the gears and the toothed bar.

In an embodiment, the sub-frame comprises a circular guide for guiding a second coupling along a circumferential direction. In this embodiment, the connection points are at the same fixed distance with respect to the common central point. Moreover, the common central point corresponds substantially with the centre point of the circular guide.

Alternatively, the sub-frame could comprise a plurality of curved guides, each curved guide being arranged to guide a second coupling of connecting member therein. This allows each second coupling to be assigned to a specific curved guide. In this case, the curves correspond to a circle or a part thereof, wherein the centre of each circle coincides with the common central point. However, this configuration allows for different distances between the connection points and the common central point. In other words, each of the curved guides may describe a circle or part thereof having a different radius.

In both cases, the sub-frame can be fixedly connected to the cabin, and each second coupling can be guided in the circular guide. In this case, each second coupling can be provided with an individually controllable actuator for engaging the circular guide and/or the cabin in the circumferential direction. However, such actuators may also be arranged on the circular guide itself.

In a further embodiment, each individually controllable actuator is configured to drive a separate gear and the cabin and/or circular guide is provided with a curved toothed bar disposed around its circumference.

Engagement between the toothed bar and the gears can be directly or the motion platform could comprise a notched belt or toothed belt to provide transmission between each of the gears and the toothed bar.

Next, possible implementations are discussed in more detail. Although not limited to the number of uprights and connecting members, these implementations are described in connection with three identical connecting members and three identical uprights. Moreover, each implementation is configured to offer six degrees of freedom, i.e. translational movement in x, y, and z direction, pitch, roll, and yaw. The implementations are indicated in table 1.

Here, the number in the left column identifies an implementation by a number. The '+' sign indicates whether a particular individually controllable actuator is arranged. In particular:

'actuator vertical upright' indicates whether an actuator is arranged on the connecting member or the upright to cause a vertical displacement of the relevant first coupling;

'actuator pivot upright' indicates that an actuator is arranged on the connecting member or the upright to pivot the first coupling with respect to the upright;

'actuator sub-frame cabin' indicates that an actuator is arranged on the sub-frame or cabin to cause a relative movement between the sub-frame and cabin, such as a movement of a connection point with respect to the cabin;

'actuator arm length' indicates that an actuator is arranged on the upright or the connecting member to change the arm length; and 'actuator rotate cabin' indicates whether an actuator is arranged in the cabin or on the sub-frame to rotate the cabin relative to the sub-frame. The difference with 'actuator sub-frame cabin' lies in the fact, that the latter may also be used to change the positioning of the motion platform as previously described.

In the column to the right, the total number of actuators in the motion platform is indicated. This number is based on a motion platform having three uprights and three connecting members.

TABLE 1

Possible implementations of the motion platform.

| | Actuator vertical upright | Actuator pivot upright | Actuator sub-frame cabin | actuator arm length | actuator rotate cabin | number of actuators |
|---|---|---|---|---|---|---|
| 1_1 | + | + | | N.A. | + | 7 |
| 1_2 | + | | + | N.A. | | 6 |
| 2_1 | + | + | | | + | 7 |
| 2_2 | + | | + | | | 6 |
| 2_3 | + | | | + | + | 7 |
| 3_1 | + | N.A. | + | | | 6 |
| 3_2 | + | N.A. | | + | + | 7 |
| 4_1 | + | + | N.A. | | + | 7 |
| 4_2 | + | | N.A. | + | + | 7 |

In a first implementation (1_1 & 1_2), the length of the arm of each connecting member is fixed, the first couplings can pivot with respect to the upright, the connection points are movable with respect to the common central point, and each second coupling comprises three rotational axes relevant for the motion between the corresponding arm and the sub-frame.

In a second implementation (2_1-2_3), the length of each arm is variable, the first couplings can pivot with respect to the upright, the connection points are movable with respect to the common central point, and each second coupling comprises only two rotational axes relevant for the motion between the corresponding arm and the sub-frame.

In a third implementation (3_1 & 3_2), the length of each arm is variable, the first couplings cannot pivot with respect to the corresponding upright, the connection points are movable with respect to the common central point, and each second coupling comprises three rotational axes relevant for the motion between the corresponding arm and the sub-frame.

In a fourth implementation (4_1 & 4_2), the length of each arm is variable, the first couplings can pivot with respect to the upright, the connection points are fixed with respect to the common central point, and each second coupling comprises three rotational axes relevant for the motion between the corresponding arm and the sub-frame. In an embodiment, the length of the arm of at least one of the connecting members is adjustable. Hence, a combination of connecting members with fixed and variable arm length is possible.

In implementations 2_x, 3_x, and 4_x, the arm length is variable. A possible embodiment of a motion platform with variable arm length comprises a plurality of arm parts intertwined and hingedly connected in a scissor like manner. The arm has a first end arm part and a second end arm part. The length of the arm can be adjusted by modifying the distance between the first and second end arm parts in a direction perpendicular to a length direction of the arm.

In a further embodiment, the first coupling of the at least one of the connecting members comprises a separate coupling for said first end arm part and said second end arm part to couple the first and second end arm part movably to the relevant upright. An individually controllable actuator can be arranged on the arm or the relevant upright for allowing at least one of the first and second end arm parts to move along the upright. However, by arranging an individually controllable actuator on the arm or the relevant upright for the first and second end arm parts, the first and second end arm parts can move along the upright individually from each other. This offers the possibility to change the arm length and to change the vertical position of the first coupling, even simultaneously.

In another embodiment, not indicated in table 1, the connecting members each comprise an arm having a variable length in the form of telescopic arm. The arm is connected to the upright using a first coupling. Such coupling has a single rotational axis relevant for the motion between the arm and the corresponding upright. The telescopic arm comprises a rod that can be received in a tubular part. The second coupling corresponds in this case to the coupling between the rod and the tubular part. Moreover, the connection point is the point where the rod starts to be received in the tubular part. The telescopic arms of the connecting members extend towards the common central point where they are hingedly connected to each other using a hinge device. This device may offer but one rotation axis for the telescopic arms to pivot relative to each other, although more rotation axes are not excluded. In this embodiment, the telescopic arm is part of the sub-frame and the relevant connecting member. For instance, the connecting member can comprise the rod, whereas the tubular part can be considered as part of the sub-frame. The point where the two meet is referred to as the connection point. The cabin in this embodiment is normally connected, preferably pivotally, to the hinge device. Also in this embodiment, the connection points are spaced apart and are allowed to move relative to the common central point, although the possible degrees of freedom are less.

With respect to the implementations 1_1, 2_1, 2_3, 3_2, it is noted that a separate actuator for rotating the cabin, (i.e. 'actuator rotate cabin') must be used to have the cabin rotate fully about its axis. This also applies to the fourth implementation wherein the connection points cannot move. In those implementations, the cabin cannot make a full rotation with respect to the stationary frame without the additional actuator.

With some of the implementations above, combinations of actuators may be employed. For instance, implementations 2_2 and 2_3 may well be combined. In such a case, one actuator arranged on the upright for changing the arm length, albeit in combination with the already present actuator for vertical displacement, is combined with two actuators arranged on the sub-frame for rotating the cabin with respect to the sub-frame. The skilled person understands that various combinations are possible so long as the number of actuators, the desired types of motion, and the degrees of freedom of the motion platform are matched.

As shown above, if the connection points are allowed to move relative to the common central point, although maintaining a fixed distance therewith, it becomes possible to use six actuators to obtain six degrees of freedom. However, whether six actuators are actually used, instead of seven, depends on the location of the actuators.

It is advantageous to configure the uprights and the connecting arms in a substantially identical manner. This allows the motion platform to be built using similar components, e.g. identical connecting members and uprights. Consequently, the construction process becomes less complex and the costs for fabricating each component can be reduced because of economy of scale.

If the motion platform comprises only three uprights and only three connecting members, a strongly reduced if not minimal configuration is obtained for realizing a stable motion platform.

In an embodiment, the motion platform comprises a controller for individually controlling each actuator in the motion platform. Such a controller may be programmable such that a predefined sequence of movements is performed. A possible commercial embodiment could for instance be an attraction on a fairground or amusement park.

The present invention also provides an aircraft simulator that comprises the motion platform as defined before. In addition, the simulator comprises a manually operable control element, such as a joystick, arranged in the cabin of the motion platform, wherein said controller is configured to control each actuator of the motion platform in correspondence with an operation of said control element.

The simulator may be combined with a display system which displays a picture, in dependence of the positioning and orientation of the motion platform.

According to a further aspect, the present invention relates to a motion platform that comprises a stationary frame with at least three uprights, a sub-frame disposed substantially within the stationary frame, at least three connecting members for connecting each upright with the sub-frame at a respective connection point, a cabin, connected to the sub-frame, and being suitable for accommodating a person, and a plurality of actuators. The sub-frame, the connecting members, and the cabin form a jointed structure configured to enable a translational motion and at least one of the group consisting of a pitch, a yaw, and a roll of said cabin with respect to the stationary frame by means of the plurality of actuators engaging the structure. Furthermore, the sub-frame and connecting members are configured such that, during use, each of the connection points is at a substantially fixed distance with respect to a common central point of the sub-frame. Even further, during use, the connection points are movable with respect to each other and to the common central point while keeping the distance between the common central point and each of the connection points substantially fixed. The motion platform may be further characterized by any of the features mentioned up to this point.

Next, the description will be described with reference to the accompanying drawings, wherein:

FIG. 4 shows a detailed illustration of the connection between the sub-frame and the connecting member of the embodiment of FIG. 1;

FIGS. 5A and 5B illustrate a side view and a top view of the embodiment of FIG. 1;

FIG. 9A-9E illustrate different ways to apply weight compensation to the embodiments of the motion platform of FIGS. 1-8.

Figure 1:
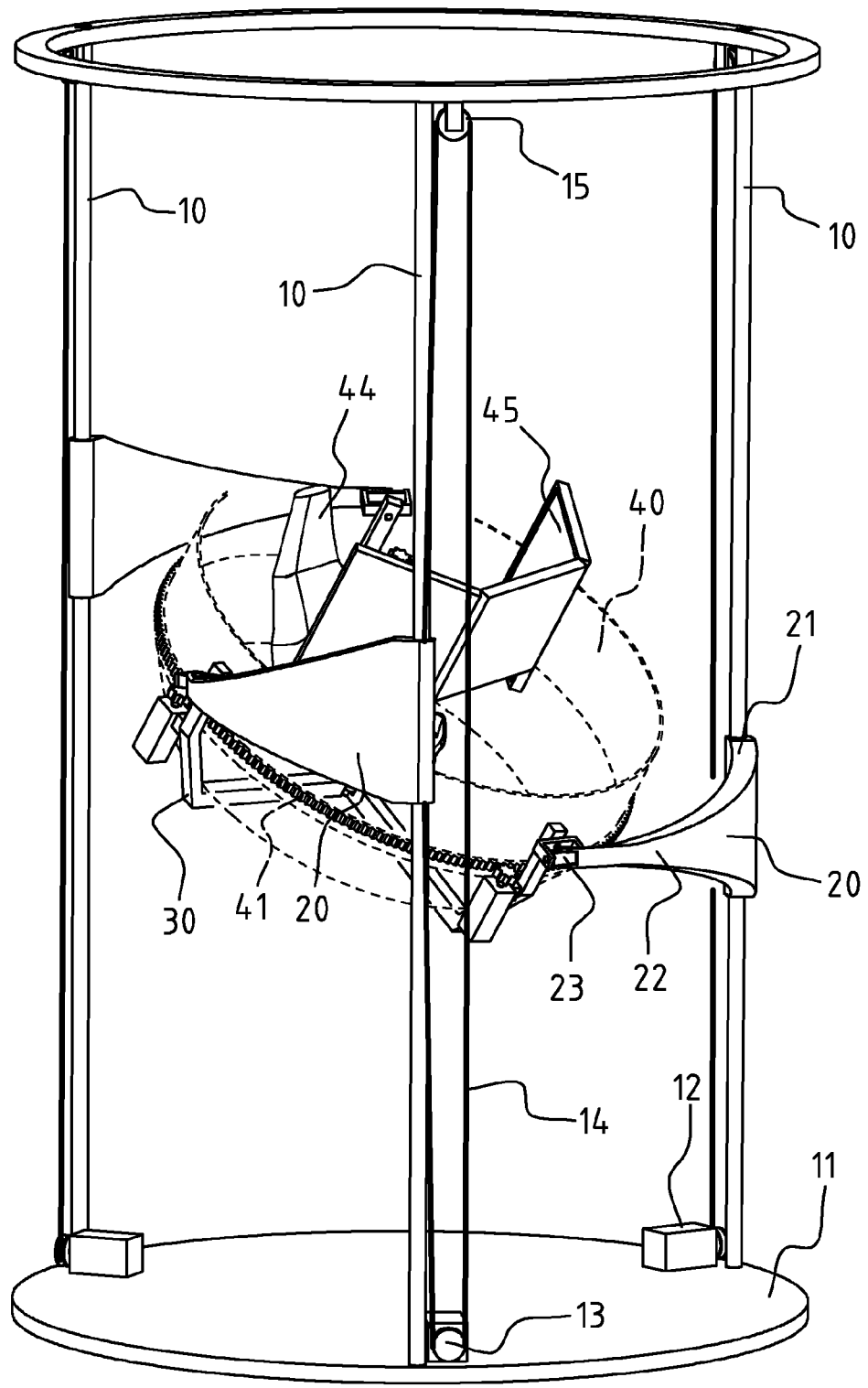
FIG. 1 illustrates an embodiment of a motion platform according to the present invention.

FIGS. 1-5B illustrate an embodiment of a motion platform according to the present invention. It comprises three uprights 10 that are fixedly connected to a supporting surface 11. A sub-frame 30 is substantially disposed within the space defined by uprights 10. Sub-frame 30 is connected to uprights 10 by connecting members 20. These members each consist of a first coupling 21, an arm 22, and a second coupling 23. In FIG. 1, first coupling 21 is integrally connected to arm 22 and rotationally coupled to upright 10. First coupling 21 has a ring shape enclosing upright 10.

Figure 2:
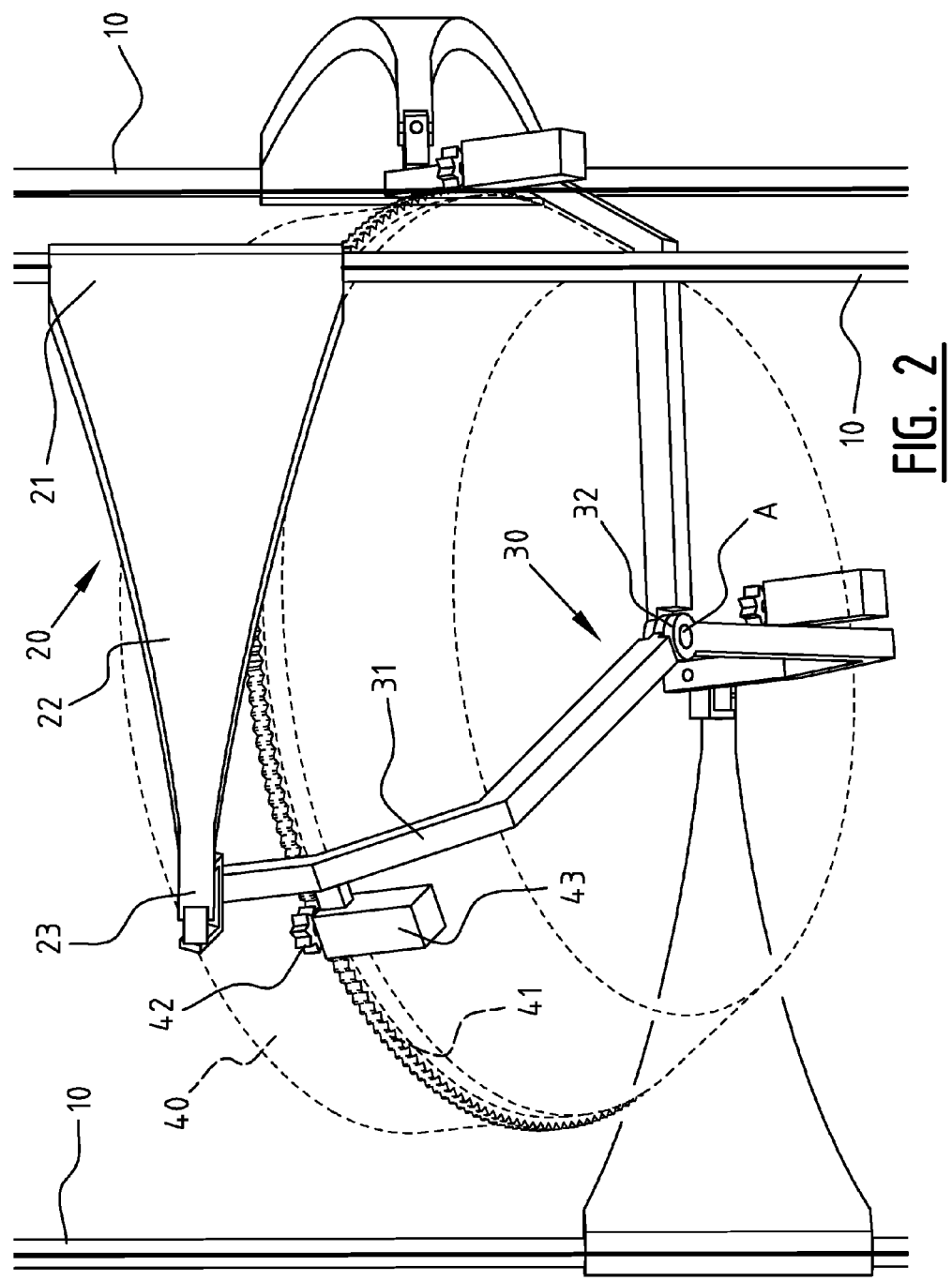
FIG. 2 shows a perspective bottom view of the embodiment of FIG. 1.
Figure 3:
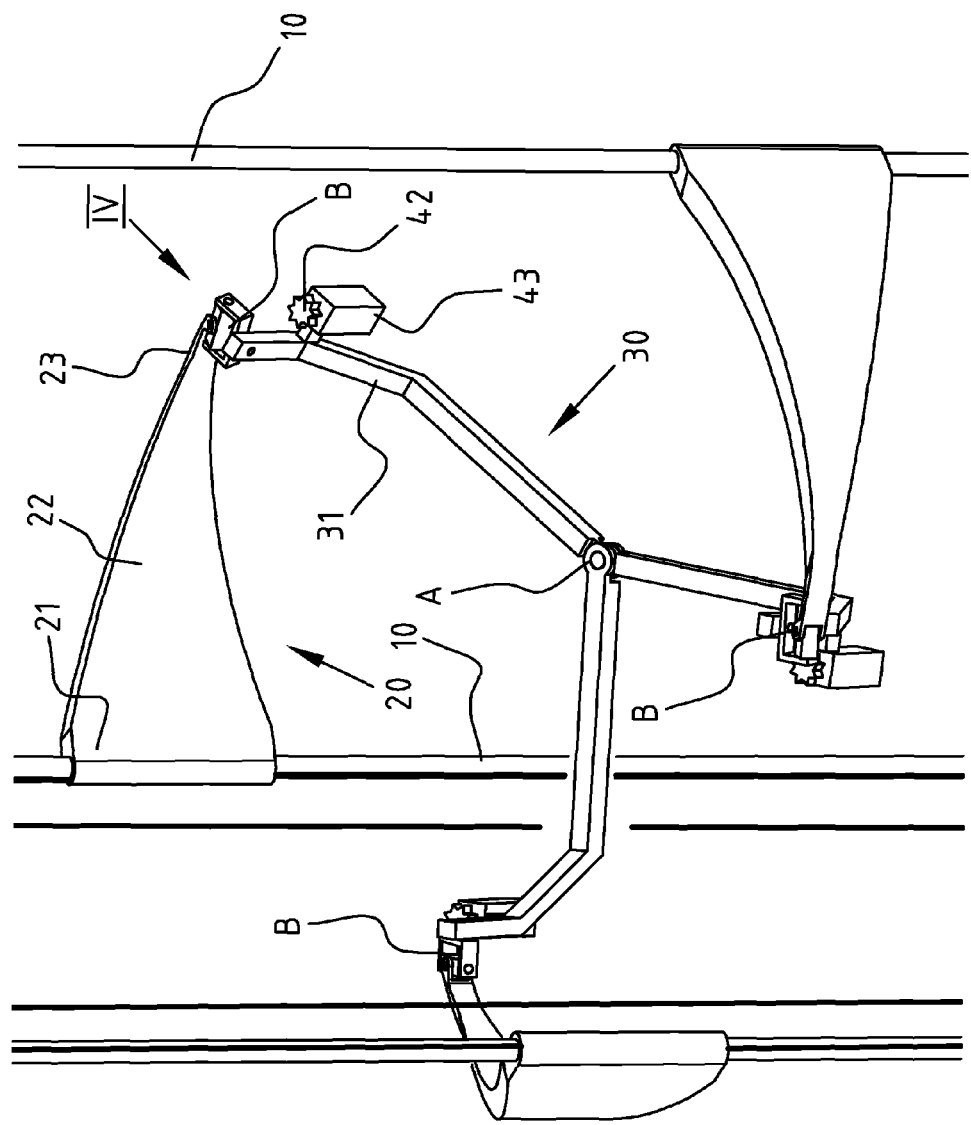
FIG. 3 shows the embodiment of FIG. 1, wherein the cabin has been left out.

Second coupling 23 is connected to sub-frame 30, which in FIG. 2 comprises first further arms 31. Sub-frame 30 is connected to cabin 40. A user of the motion platform can sit in cabin 40 on a seat 44. Furthermore, a display system 45 is arranged on which the user is shown pictures representing a fictional environment of a simulated aircraft.

A pulley system is used to move first coupling 21 up and down upright 10. The system comprises an actuator 12 that drives a driving wheel 13. A cable 14 runs between driving wheel 13 and a pulley 15. Cable 14 is connected to first coupling 21 of connecting member 20. By driving wheel 13, connecting member 20 can be moved up and down. Each upright 10 is provided with a separate actuator 12, which can be controlled individually. Moreover, counterweights can be connected to cable 14 to obtain a balanced system. This offers the advantage that actuators 12 can move first couplings 21 more easily.

Sub-frame 30, illustrated in more detail in FIG. 2, comprises first further arms 31 that are mutually coupled by a hinged connection 32. This connection coincides with a common central point A. Further arms 31 extend from the common central point A towards the points where first further arms 31 are connected to second couplings 23. These points are referred to as connection points B. In FIGS. 1-5B, three different connection points B can be identified, corresponding to the three distinct first further arms 31.

It is noted, that the distance between common central point A and each of the connection points B is fixed. Furthermore, because of the hinged connection 32, first further arms 31 can rotate with respect to common central point A. Hence, connection points B can move with respect to common central point A, albeit at a fixed distance.

Cabin 40 is rotationally coupled to sub-frame 30. A curved toothed bar 41 is arranged along the circumference of cabin 40 and is engaged by a gear 42 that can be driven by actuator 43, the latter being arranged on a first further arm 31. The motion platform in FIG. 1 comprises three actuators 43, which can be controlled individually.

If every actuator 12 operates at the same speed, the entire system of connecting members 20, sub-frame 30, and cabin 40 will either move up or down. However, if actuators 12 are not driven at the same speed, connecting members 20, sub-frame 30, and/or cabin 40 must adjust their positioning to account for the different vertical position of connecting members 20. For instance, connecting members 20 may rotate with respect to the corresponding uprights 10, and sub-frame 30 can change perform a pitch, yaw, or roll movement, as well as a translational movement.

Similar considerations apply for actuators 43. When driven simultaneously and at the same speed, cabin 40 will rotate with respect to sub-frame 30 without inducing or requiring repositioning of first further arms 31. However, when not driven simultaneously, connecting members 20, cabin 40, and first further arms 31 must re-position themselves, for example resulting in a translational movement.

To make sure that the various motions relevant for an aircraft can be simulated, i.e. translational movement, pitch, roll, and yaw, first coupling 21 and second coupling 23 must add the appropriate amount of degrees of freedom to the system. From FIG. 1, it is clear that first coupling 21 can only rotate about upright 10, and move up and down. Second coupling 23 however, offers three rotational axes as shown in more detail in FIG. 4. The rotational axes are indicated by reference signs 24, 25, and 26, respectively.

The embodiment shown in FIGS. 1-5B corresponds to implementation 1_2 in table 1. Using the same table, it is clear that similar functionality can be achieved by replacing actuators 43 with actuators arranged on connecting members 20 for fixing the rotation angle of connecting members 20 with respect to uprights 10. In other words, a given position of connecting members 20 with respect to uprights 10 results in a single positioning of sub-frame 30. However, in this case an extra actuator is needed for rotating the cabin if such functionality is desired. Such motion platform corresponds to implementation 1_1 in table 1.

Figure 6:
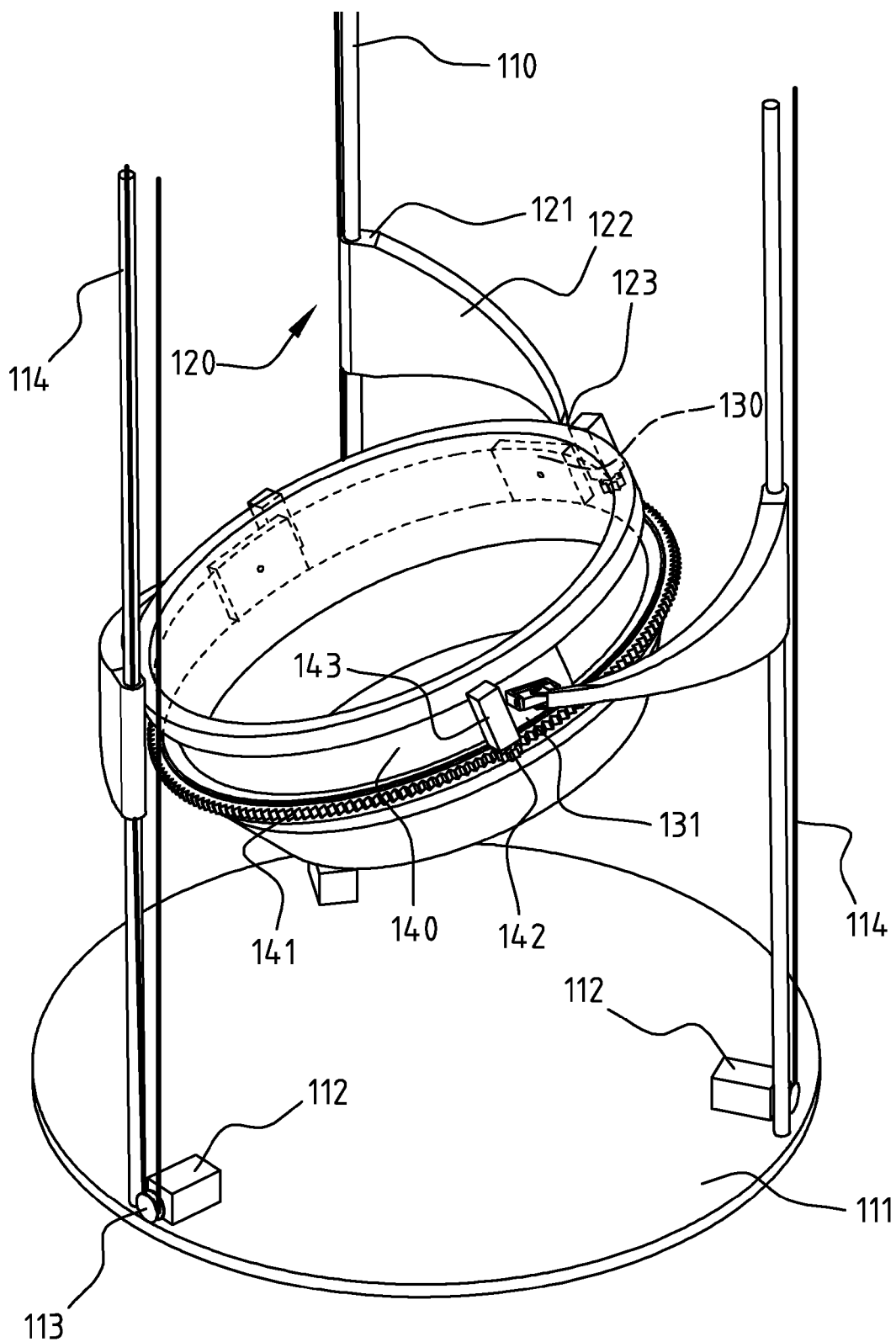
FIG. 6 show a motion platform similar to the embodiment of FIG. 1, wherein the sub-frame comprises a circular guide.

FIG. 6 shows an alternative embodiment wherein first further arms 31 have been replaced by a circular guide 131 in which second couplings 123 can be guided. Also with this embodiment, connection points B can move with respect to a common central point A. In FIG. 6, circular guide 131 forms sub-frame 130. It is integrally connected to cabin 140.

In FIG. 6, each second coupling 123 is provided with an individually controllable actuator 143 for engaging the circular guide 131 and/or the cabin 40 in the circumferential direction. To that end, the cabin and/or circular guide is provided with a curved toothed bar 141 disposed around its circumference. Each actuator 143 is drives a gear 142 which engages circular guide 131. However, it may also be possible to couple each actuator 143 with toothed bar 141 using a notched or toothed belt (not shown). In that case, gears 142 are positioned away from toothed or notched bar 141.

The motion platform in FIG. 6 operates in a similar manner as the motion platform in FIG. 1. By individually controlling the six actuators in the system, any desired motion can be achieved.

Figure 7A:
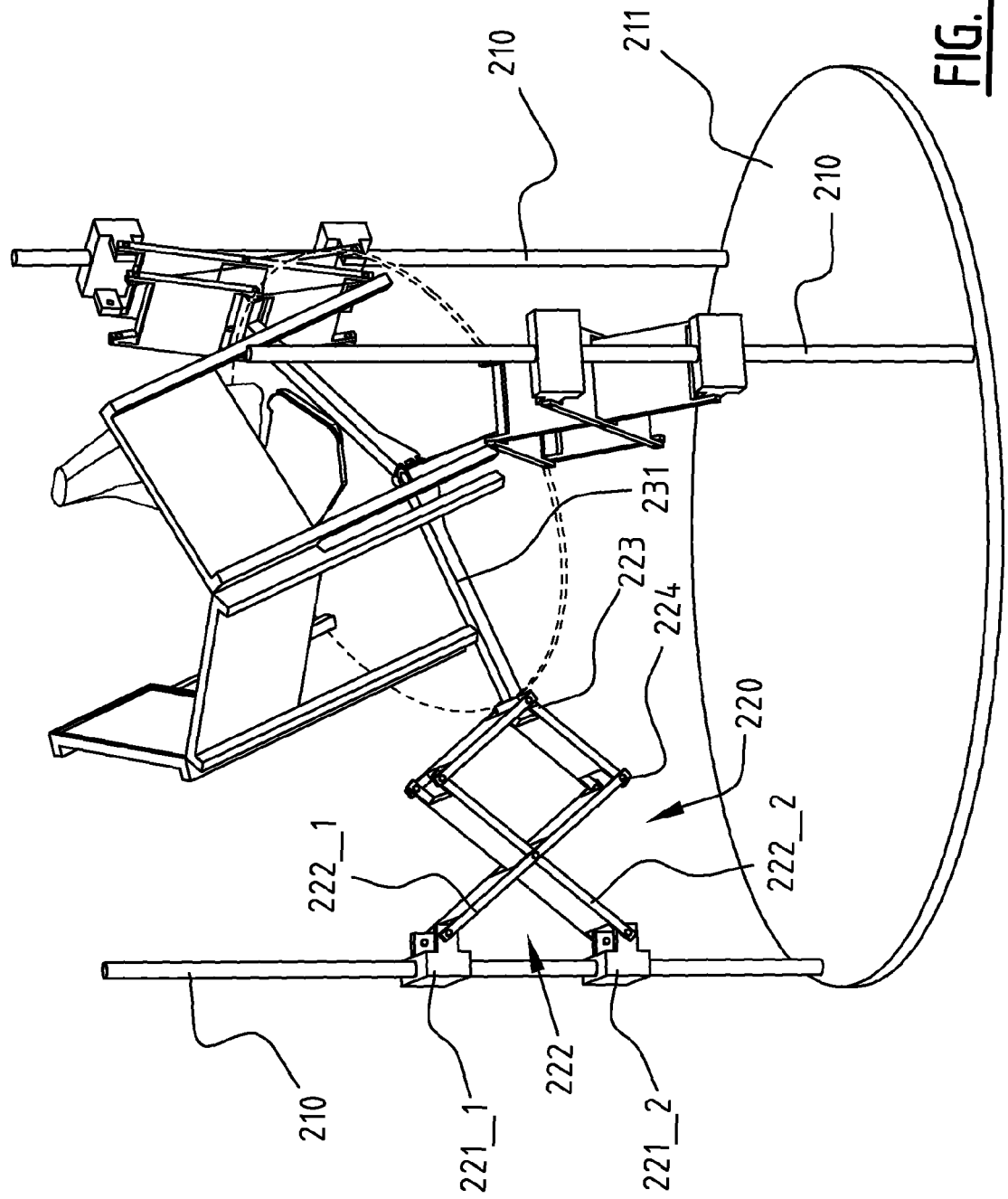
FIGS. 7A-7C show a further embodiment of a motion platform according to the invention, wherein the arm length is variable.
Figure 7B:
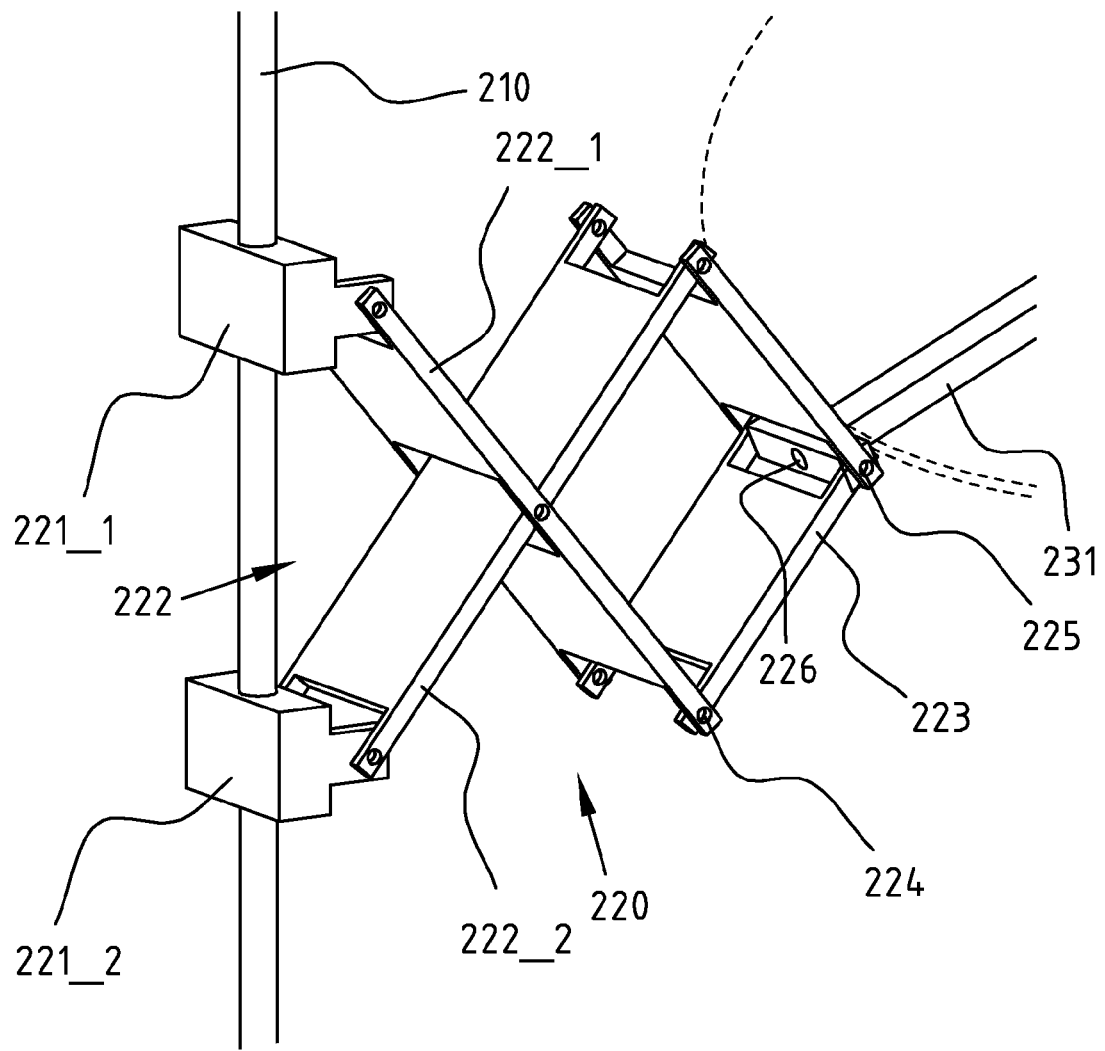
Figure 7C:
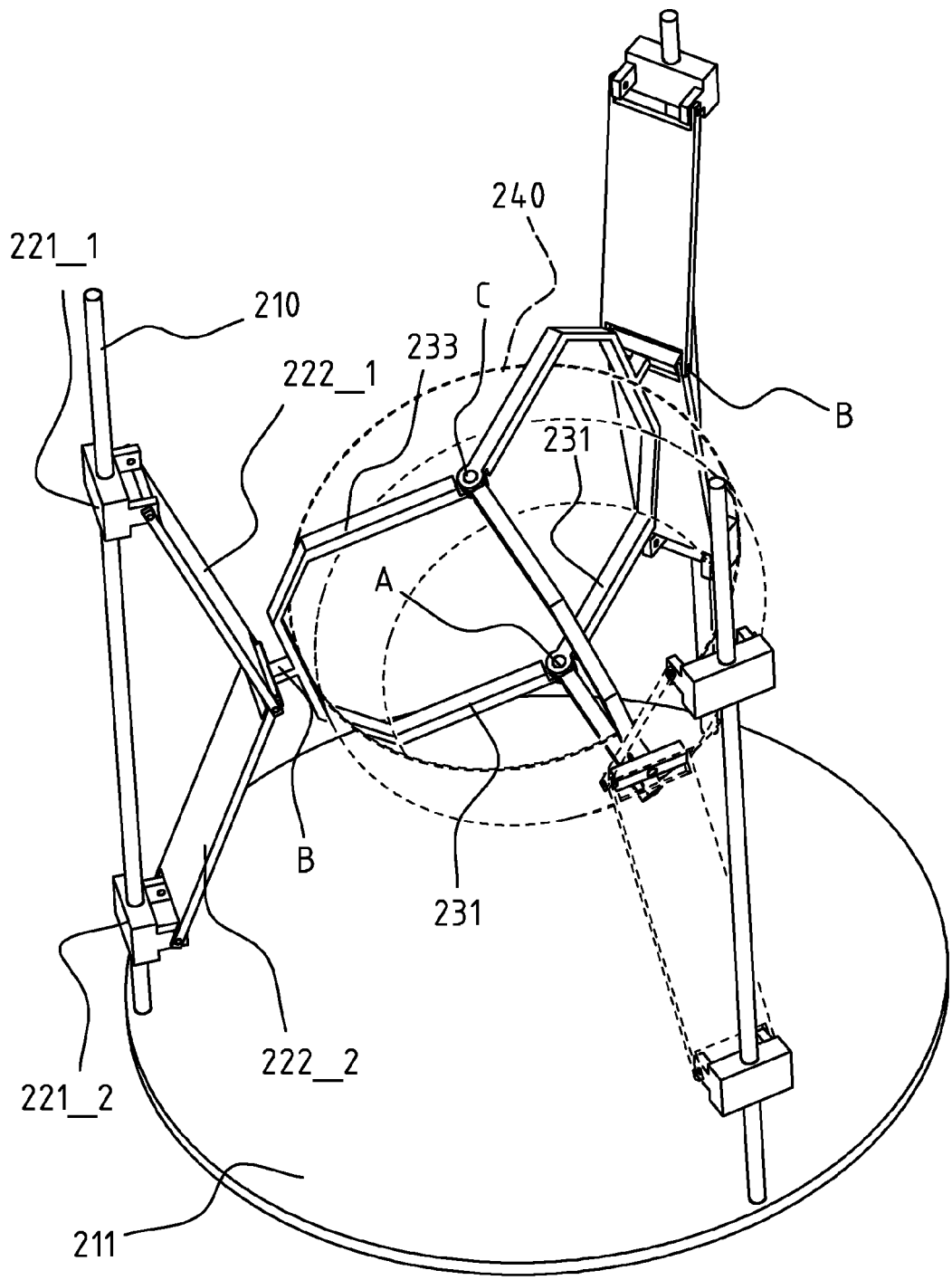

FIG. 7A-7C illustrate a different embodiment of the motion platform according to the invention. In FIG. 7A, arm 222 of the connecting member 220 comprises a plurality of arm parts intertwined and hingedly connected in a scissor like manner using hinges 224. Arm 222 has a first end arm part 222_1 and a second end arm part 222_2, wherein the length of arm 222 can be adjusted by modifying the distance between the first 222_1 and second 222_2 end arm parts in a direction perpendicular to a length direction of arm 222.

Each end arm part 222_1, 222_2 is connected to upright 210 using a separate coupling 221_1, 221_2, which together form first coupling 221. Each of couplings 221_1, 221_2 may be driven up and down upright 210 using a dedicated pulley system (not shown). The length of arm 222 can be changed by moving couplings 221_1, 221_2 with respect to each other, thereby operating connecting member 220 in a scissor like manner. Furthermore, like the embodiment in FIG. 1, couplings 221_1, 221_2 can pivot relative to upright 210.

Compared to the embodiment in FIG. 1, a degree of freedom has been added, i.e. the changing arm length. This has consequences for second coupling 223, which now only offers two rotational axes 225, 226, as shown in FIG. 7B. The remainder of the embodiment, i.e. the sub-frame and the cabin can be arranged in a similar manner as with the embodiment in FIG. 1.

Operation of the embodiment in FIG. 7A can be achieved using separate actuators for moving couplings 221_1, 221_2 of first coupling 221 up and down upright 210. However, an additional actuator is needed to rotate cabin 240. Such an embodiment corresponds to implementation 2_3 in table 1.

Actuators can also be arranged in a manner similar to that in FIG. 1. In that case, only one of couplings 221_1, 221_2 can be actuated to move up and down by an actuator arranged on upright 210. These actuators are combined with actuators on first further arms 231. By individually driving these six actuators, the motion platform can be fully controlled. Such embodiment corresponds to implementation 2_2 in table 1.

Instead of arranged actuators on first further arms 231, actuators may be provided to prescribe the rotation angle of connecting members 220 relative to uprights 210. Such embodiment corresponds to implementation 2_1 in table 1. However, as with implementation 2_3, an additional actuator is needed to rotate cabin 240 if desired.

FIG. 7C shows a further embodiment, wherein second further arms 233 are arranged in a mirror like manner to first further arms 231. First further arms 231 and second further arms 233 together form ribs defining a cavity in which cabin 240 is arranged.

In this embodiment, connecting members 222, each comprise only two arm parts 222_1, 222_2. Two couplings 221_1, 221_2 are used to couple the connecting member to upright 210.

In FIG. 7C, a further common central point C can be identified. The rotation axis of cabin 240 extends between common central point A and common central point C.

Another embodiment can be realized starting with the embodiment in FIG. 7C. In such an embodiment, one of the arm parts 222_1, 222_2 is left out, as a result of which the arm length can no longer vary. However, the remaining coupling 221_1 or 221_2 is configured to allow pivoting of connecting member 220 with respect to upright 210 about an axis perpendicular to the longitudinal axis of upright 210 and about an axis parallel to this longitudinal axis. As a result, connecting member 220 can be in an inclined position with respect to upright 210. The remainder of the motion platform can remain the same as with the embodiment in FIG. 7C.

Figure 8A:
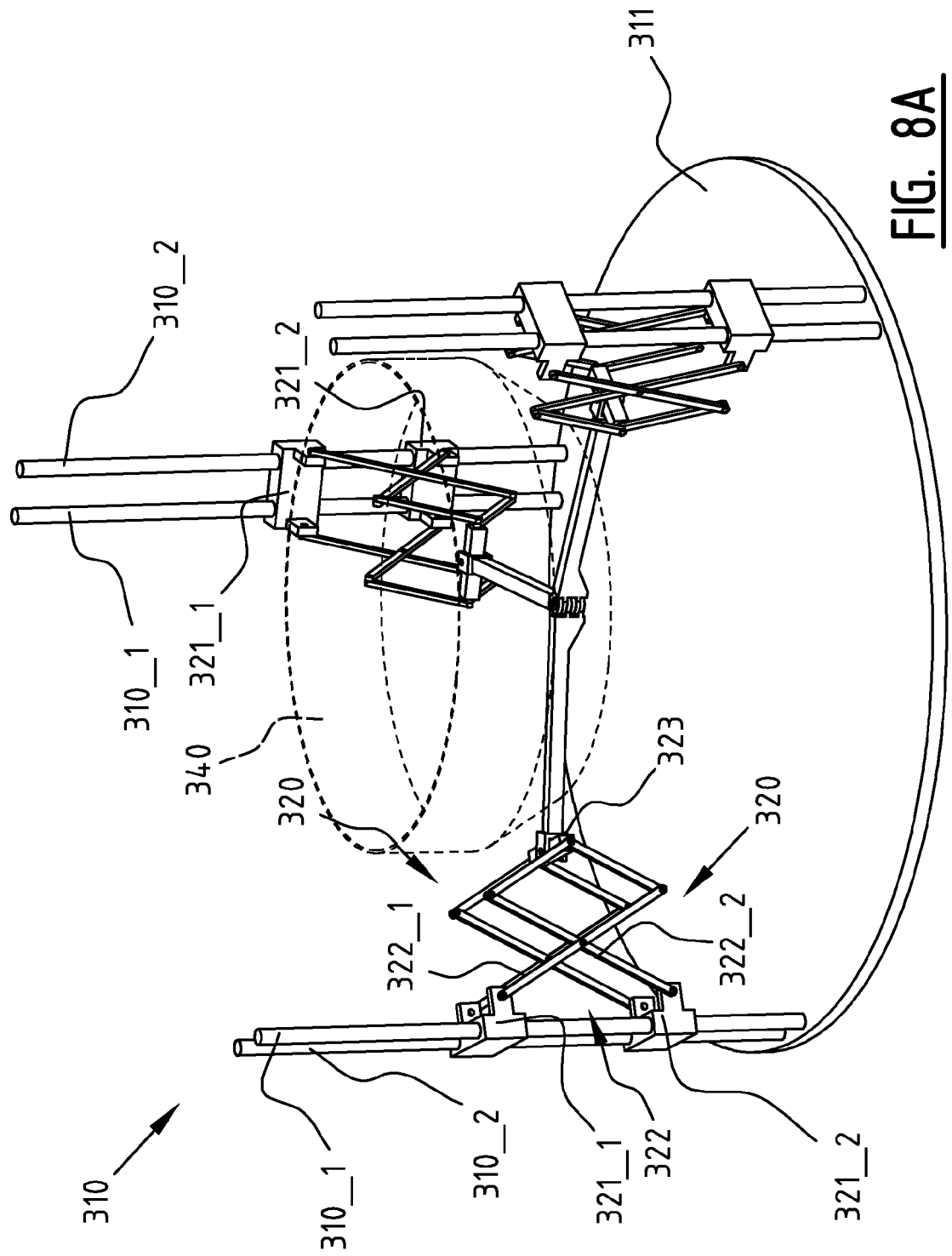
FIGS. 8A-8B show a even further embodiment of a motion platform according to the invention, wherein the arm length is variable, but wherein the connecting members cannot rotate about the uprights.
Figure 8B:
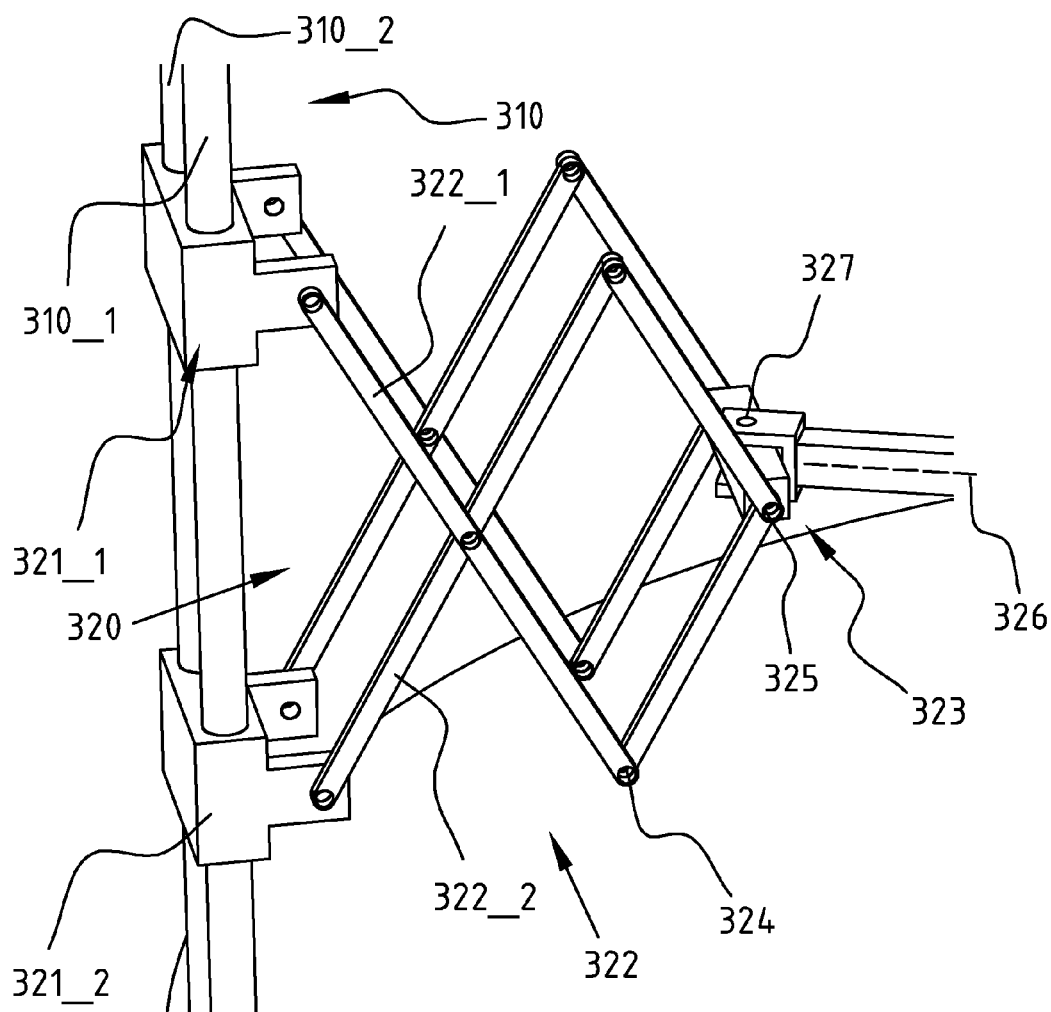

FIGS. 8A and 8B show a variation to the embodiment of FIG. 7A. Here, connecting members 320 cannot pivot with respect to uprights 310. In this embodiment, upright 310 comprises two parallel parts 310_1, 310_2. By connecting first coupling 321_1, 321_2 to both parts 310_1, 310_2, first coupling 321 as a whole can no longer pivot. Consequently, second coupling 323 must offer an additional degree of freedom compared to the second coupling in FIG. 7B. The rotation axes 325, 326, 327 for second coupling 323 are indicated in FIG. 8B.

In FIG. 8A, actuators (not shown) are arranged for one of the couplings 321_1, 321_2. Additional actuators (not shown) are arranged on the first further arms for engaging cabin 340. Such embodiment corresponds to implementation 3_1 in table 1. The actuators can be arranged differently. For instance, each coupling 321_1, 321_2 may be actuated individually. However, in this case, a separate actuator is needed for rotating cabin 340. Such embodiment corresponds to implementation 3_2 in table 1.

Another embodiment can be realized starting with the embodiment in FIG. 8A with the arm configuration of FIG. 7C. In such an embodiment, one of the arm parts 322_1, 322_2 is left out, similar to FIG. 7C, as a result of which the arm length can no longer vary. However, the remaining coupling 321_1 or 321_2 is configured to allow pivoting of connecting member 320 with respect to upright 310 about an axis perpendicular to the longitudinal axis of upright 310 and about an axis parallel to this longitudinal axis. As a result, connecting member 320 can be in an inclined position with respect to upright 310. The remainder of the motion platform can remain the same as with the embodiment in FIG. 8A.

In the embodiments discussed so far, actuators are used to move the first couplings up and down the uprights. Normally, this can be achieved by connecting the first coupling to a belt or chain which runs over a gear driven by a motor or engine. To avoid persistent strain on the motor or engine, even when the first coupling is not moving, a counter weight can be applied.

Figure 9E:
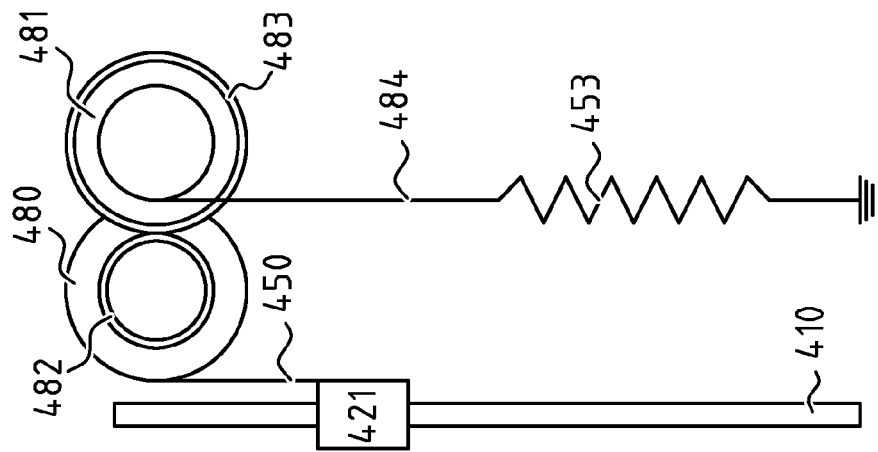
Figure 9B:
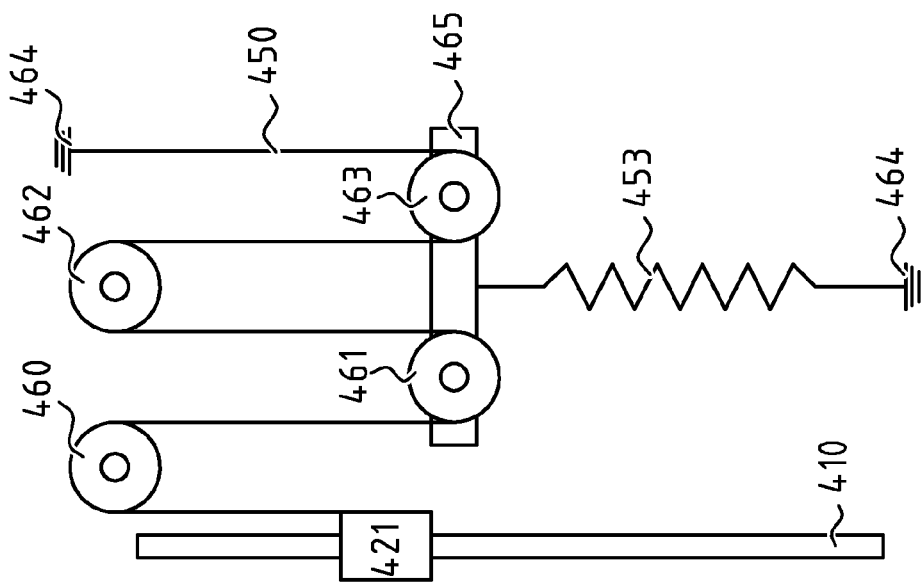
Figure 9A:
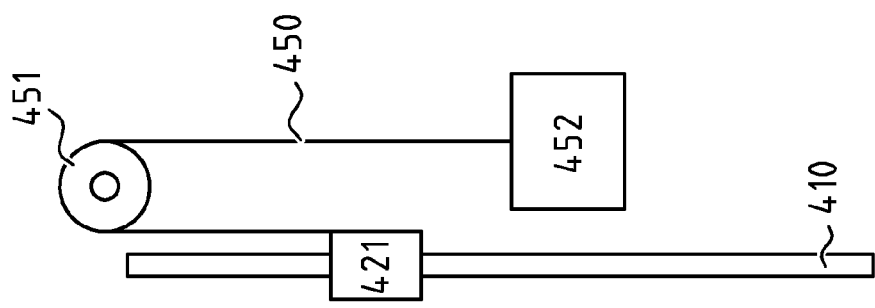

FIG. 9A shows a first embodiment of a weight compensation for the embodiments of the motion platform of FIGS. 1-8. Here, first connection point 421 can move up and down upright 410. First connection point 421 is connected via cable 450, or another connection element, to a compensating weight 452. Gravity acting on weight 452 should compensate the downward force exerted on first connection point 421 caused by the distributed weight of the connection point 421 itself and the various components connected thereto.

It is noted that cable 450 may in fact be the same cable as for instance cable 14 in FIG. 1 or it can be a separate cable or belt dedicated for the weight compensation.

Cable 450 runs over a pulley 451 which is rotationally mounted at a fixed position relative to upright 410.

Because of the weight compensation, the actuator, e.g. actuator 12 in FIG. 1, needs only to accelerate mass 452 and connection point 421 instead of providing a continuous drive to compensate for the downward force exerted on connection point 421.

A drawback of the abovementioned approach is however that both connection point 421 and mass 452 need to be accelerated if connection point 421 needs to translate along upright 410.

FIG. 9B presents a solution to this problem. In this figure, a spring 453 is used to provide the force needed for compensating the downward force exerted on connection point 421. A drawback of using a spring is that the force exerted by the spring depends on the extent in which the spring is deformed. In other words, the force exerted by the spring is not constant over the motion of first connection point 421. Moreover, as upright 410 may extend up to several meters, the demands for the physical length of the spring become impractical.

This problem has been solved in FIG. 9B by using a pulley system comprising pulleys 460-463. Here, pulleys 460, 462 have a fixed position. Pulleys 461, 463 are connected together via a beam 465 that is connected to spring 453. Consequently, pulleys 461, 463 are able to translate in the vertical direction. One end of cable 450 is fixed, e.g. to a frame, at position 464.

The advantage of the embodiment in FIG. 9B is that spring 453 needs only to move one fourth of the distance travelled by first connection point 421. Consequently, the dynamic range of the system can be improved and the physical requirements for spring 453 can be lessened. However, it should be noted that due to the pulley system the force exerted by spring 453 onto beam 465 should be four times that of the downward force exerted on connection point 421 for obtaining a balance in force.

FIGS. 9C illustrates an embodiment of weight compensation suitable for embodiments in which multiple first connection points travel up and down the same upright, such as the embodiment shown in FIGS. 7-8. Here, connection points 421_1 and 421_2 are connected via cable 450 to a weight 452. Cable 450 runs over pulleys 470, 471, 472, 473 of which only pulley 472 is able to move in the vertical direction. The advantage of this pulley configuration is that whenever first connection points 421_1 and 421_2 move relative to each other but keeping their center point fixed, such as during horizontal movement of the cabin, mass 452 remains at rest and needs not be accelerated.

FIG. 9D illustrates a solution similar to that depicted in FIG. 9B for uprights having multiple first connection points connected to them. In FIG. 9D pulleys 471, 472, 474, and 476 remain at a fixed position. Pulleys 473, 475 may move along with beam 465 in vertical direction, similar to pulleys 461, 463 in FIG. 9B.

FIG. 9E displays a solution similar to the one depicted in FIG. 9B. However, in this figure two wheels 480, 481 are used that mutually engage via teeth 482, 483 which are fixedly connected to the respective wheels 480, 481.

In FIG. 9E, cable 450 is wound around wheel 480. This causes wheel 480 to rotate whenever first connection point 421 is moving. This in turn causes wheel 481 to rotate via the mutually engaging teeth 482, 483. The gear ratio between teeth 482, 483 is such that wheel 481 will rotate much less than wheel 480. Cable 484, which is wound around wheel 481, will therefore move less than cable 450. As depicted in FIG. 9E, the effective radius around which cables 450, 484 are wound can also differ between wheels 480, 481.

As mentioned, cable 484 moves much less than the corresponding translation of first connection point 421. Similar to FIG. 9B, the physical requirements of spring 453 can therefore be lessened. By using more gears, this effect can be increased. A similar approach can be applied to embodiments that use multiple first connection points on the same upright, such as illustrated in FIG. 9C. In such case, the gear based weight compensation scheme could for instance be applied to each first connection point individually. For instance, pulleys 471, 473 in FIG. 9C could each be replaced by a set of coupled wheels 480, 481 as depicted in FIG. 9E. Auxiliary pulleys may be employed to suitably guide cable 450 in such case.

In the embodiments described above, the common central point A coincided with the rotation axis of the cabin. Furthermore, common central point A also coincided with the hinged connection of first further arms. However, the skilled person understands that, although this choice has structural advantages, the rotation axis may be arranged offset to the common central point and/or the hinged connection may be replaced by a fixed connection. In this latter case, first and/or second couplings must be adapted to account for the loss of degrees of freedom.

In the above, the invention has been described using embodiments thereof. The skilled person understands that various modifications to these or other embodiments are possible without departing from the scope of protection as defined by the appended claims.

For instance, the motion platform and simulator could be used for simulating motion or behavior of other devices, such as automobiles or motorized vehicles in general such as cars and motor cycles. However, it may also be used to simulate boats, helicopters, and the like. It may even be used to merely impart motion to an object in general. In the latter case, the cabin serves to accommodate the object. It need not be of the size to accommodate a person. The cabin may even be omitted in such case as the object can be connected, preferably in a releasable manner, to the sub-frame.

The invention claimed is:

1. A motion platform, comprising:
a stationary frame with at least three uprights;
a sub-frame disposed substantially within the stationary frame;
at least three connecting members for connecting each upright with the sub-frame at a respective connection point, wherein each connecting member comprises an arm, a first coupling, and a second coupling, wherein the first coupling couples a first end of the arm to at least one of said uprights of the stationary frame, and wherein the second coupling couples a second end of the arm to the sub-frame at said connection point;
a cabin, connected to the sub-frame, and being suitable for accommodating a person;
a plurality of actuators;
wherein the sub-frame, the connecting members, and the cabin form a jointed structure configured to enable a translational motion and at least one of the group consisting of a pitch, a yaw, and a roll of said cabin with respect to the stationary frame by means of the plurality of actuators engaging the structure;
wherein the sub-frame and connecting members are configured such that, during use, each of the connection points is at a substantially fixed distance with respect to a common central point of the sub-frame;
wherein the first coupling of at least one of the connecting members is movably mounted to the relevant upright to allow vertical displacement of the first coupling relative to the upright; and
wherein, during use, the connection points are moveable with respect to each other to change the distances between them, and wherein each connection point is moveable along a respective circle relative to the sub-frame.

2. The motion platform according to claim 1, wherein the respective circles relative to the sub-frame in which each connection point is moved are each identical to a circle that has the common central point of the sub-frame as its center point.

3. The motion platform according to claim 1, wherein said structure is configured to enable a translational motion, a pitch, a yaw, and a roll of said cabin with respect to the stationary frame.

4. The motion platform according to claim 1, wherein the first coupling of at least one of the connecting members is configured to allow the arm of said at least one of the connecting members to pivot with respect to the relevant upright; and
wherein an individually controllable actuator is preferably arranged on said at least one of the connecting members or said relevant upright for causing said pivoting of the arm of said at least one of the connecting members with respect to said relevant upright.

5. The motion platform according to claim 4, wherein the sub-frame comprises a circular guide for guiding a second coupling along a circumferential direction;
wherein the sub-frame is preferably fixedly connected to the cabin, and wherein each second coupling is guided in the circular guide, each second coupling being provided with an individually controllable actuator for engaging the circular guide and/or the cabin in the circumferential direction, each individually controllable actuator being preferably configured to drive a separate gear, the cabin and/or circular guide being provided with a curved toothed bar disposed around its circumference, and wherein:
said toothed bar engaging said gears directly; or
said gears being positioned away from said toothed bar, the motion platform further comprising a notched belt or toothed belt to provide transmission between each of said gears and said toothed bar.

6. The motion platform according to claim 4, wherein the length of each arm is fixed, wherein the connection points are movable with respect to the common central point, and wherein each second coupling comprises three rotational axes relevant for the motion between the corresponding arm and the sub-frame.

7. The motion platform according to claim 4, wherein the connection points are movable with respect to the common central point, and wherein each second coupling comprises only two rotational axes relevant for the motion between the corresponding arm and the sub-frame, or wherein the connection points are fixed with respect to the common central point, and wherein each second coupling comprises three rotational axes relevant for the motion between the corresponding arm and the sub-frame.

8. The motion platform according to claim 1, wherein the cabin is pivotally mounted to the sub-frame to allow the cabin to rotate about a rotation axis;
wherein the rotation axis preferably intersects the common central point, the cabin being preferably rotationally mounted to the sub-frame at said common central point;
wherein the connection points preferably lie substantially in a plane that extends perpendicularly to the rotation axis; and
the motion platform preferably comprising an actuator arranged on the sub-frame or the cabin for rotating the cabin with respect to the sub-frame.

9. The motion platform according to claim 8, wherein the sub-frame comprises a plurality of first further arms, each of said plurality of first further arms extending from the common central point towards a connection point;
wherein the first further arms are preferably hingedly connected to each other at the common central point;
the motion platform preferably further comprising a further common central point spaced apart from the common central point, from which further common central point a plurality of second further arms extend to the connection points, wherein the first further arms and the second further arms form ribs that extend between the common central point and the further common central point, together defining a cavity in which the cabin is accommodated; and the second further arms preferably being hingedly connected to each other at the further common central point, wherein the further common central point preferably lying on the rotation axis, and the cabin preferably being rotationally mounted to the sub-frame at said common central point and at said further common central point.

10. The motion platform according to claim 9, comprising an individually controllable actuator configured:

to provide an engagement between a connecting member and the cabin to change the relative positioning between said connecting member and said cabin; or to provide an engagement between a connecting member and the sub-frame to change the relative positioning between said connecting member and said sub-frame; or to provide an engagement between the sub-frame and the cabin to change the relative positioning between said sub-frame and said cabin; or to provide an engagement between a connecting member and a first further arm connected thereto to change the relative positioning between said connecting member and said first further arm; or to provide an engagement between a first further arm and the cabin to change the relative positioning between said first further arm and the cabin;

wherein an individually controllable actuator as defined above is preferably disposed on each first further arm or rib, the actuators being configured for engaging the cabin in the rotational direction of the cabin, the cabin being preferably further provided with a curved toothed bar disposed around its outer circumference, and the individually controllable actuators are each configured to drive a separate gear, and wherein:

said toothed bar engaging said gears directly; or said gears being positioned away from said toothed bar, the motion platform further comprising a notched belt or toothed belt to provide transmission between each of said gears and said toothed bar.

11. The motion platform according to claim 1, wherein a length of the arm of at least one of the connecting members is adjustable;

wherein the arm preferably comprises a plurality of arm parts intertwined and hingedly connected in a scissor like manner, said arm having a first end arm part and a second end arm part, wherein the length of the arm can be adjusted by modifying the distance between the first and second end arm parts in a direction perpendicular to a length direction of the arm, wherein the first coupling of said at least one of the connecting members preferably further comprises a separate coupling for said first end arm part and said second end arm part to couple the first and second end arm parts movably to the relevant upright, wherein an individually controllable actuator is arranged on the arm or the relevant upright for allowing at least one of the first and second end arm parts to move along the upright, and wherein an individually controllable actuator is preferably arranged on the arm or the relevant upright for the first and second end arm parts, for allowing the first and second arm parts to move along the upright individually from each other.

12. The motion platform according to claim 1, wherein the uprights and the connecting arms are configured in a substantially identical manner.

13. The motion platform according to claim 1, comprising only three uprights and only three connecting members.

14. The motion platform according to claim 1, comprising a controller for individually controlling each actuator in the motion platform.

15. Aircraft simulator, comprising the motion platform as defined in claim 14, the aircraft simulator further comprising a manually operable control element, such as a joystick, arranged in the cabin of the motion platform, wherein said controller is configured to control each actuator of the motion platform in correspondence with an operation of said control element.

16. The motion platform according to claim 1, wherein each first coupling is not able to pivot with respect to the upright it is connected to, and wherein each second coupling comprises three rotational axes relevant for the motion between the corresponding arm and the sub-frame.

17. A motion platform, comprising:

a stationary frame with at least three uprights;

a sub-frame disposed substantially within the stationary frame;

at least three connecting members for connecting each upright with the sub-frame at a respective connection point, wherein each connecting member comprises an arm, a first coupling, and a second coupling, wherein the first coupling couples a first end of the arm to at least one of said uprights of the stationary frame, and wherein the second coupling couples a second end of the arm to the sub-frame at said connection point;

a cabin, connected to the sub-frame, and being suitable for accommodating a person;

a plurality of actuators;

wherein the sub-frame, the connecting members, and the cabin form a jointed structure configured to enable a translational motion and at least one of the group consisting of a pitch, a yaw, and a roll of said cabin with respect to the stationary frame by means of the plurality of actuators engaging the structure;

wherein the first coupling of at least one of the connecting members is movably mounted to the relevant upright to allow vertical displacement of the first coupling relative to the upright; and wherein, during use, the connection points are moveable with respect to each other to change the distances between them, and wherein each connection point is moveable along a respective curve relative to the sub-frame.

18. The motion platform according to claim 17, said curve being a circle.

19. The motion platform according to claim 17, wherein the first coupling of each of the connecting members is movably mounted to the relevant upright to allow vertical displacement of the first coupling relative to the upright.

20. A motion platform, comprising:

a stationary frame with at least three uprights;

a sub-frame disposed substantially within the stationary frame;

at least three connecting members for connecting each upright with the sub-frame at a respective connection point, wherein each connecting member comprises an arm, a first coupling, and a second coupling, wherein the first coupling couples a first end of the arm to at least one of said uprights of the stationary frame, and wherein the second coupling couples a second end of the arm to the sub-frame at said connection point;

a cabin, connected to the sub-frame, and being suitable for accommodating a person;

a plurality of actuators;

wherein the sub-frame, the connecting members, and the cabin form a jointed structure configured to enable a translational motion and at least one of the group consisting of a pitch, a yaw, and a roll of said cabin with respect to the stationary frame by means of the plurality of actuators engaging the structure; and wherein, during use, the connection points are moveable with respect to each other to change the distances between them, and wherein each connection point is moveable along a respective curve relative to the sub-frame.

* * * * *